US010626029B2

(12) United States Patent
Lin

(10) Patent No.: US 10,626,029 B2
(45) Date of Patent: Apr. 21, 2020

(54) HIGH-PERFORMANCE ANION EXCHANGE MEMBRANES AND METHODS OF MAKING SAME

(71) Applicants: Evoqua Water Technologies LLC, Lowell, MA (US); Jenny Lin, Bedford, MA (US)

(72) Inventor: Juchui Ray Lin, Bedford, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 15/805,746

(22) Filed: Nov. 7, 2017

(65) Prior Publication Data

US 2018/0057370 A1 Mar. 1, 2018

Related U.S. Application Data

(62) Division of application No. 14/433,063, filed as application No. PCT/US2013/031957 on Mar. 15, 2013, now abandoned.

(60) Provisional application No. 61/709,475, filed on Oct. 4, 2012.

(51) Int. Cl.
| | | |
|---|---|---|
| *C02F 1/46* | (2006.01) | |
| *B05D 3/06* | (2006.01) | |
| *B05D 5/00* | (2006.01) | |
| *C08F 226/06* | (2006.01) | |
| *C08F 220/10* | (2006.01) | |
| *B01J 41/14* | (2006.01) | |
| *B01J 47/12* | (2017.01) | |
| *H01M 8/10* | (2016.01) | |
| *C02F 1/469* | (2006.01) | |
| *C08F 222/10* | (2006.01) | |
| *H01M 8/103* | (2016.01) | |
| *H01M 8/1058* | (2016.01) | |
| *H01M 8/1072* | (2016.01) | |
| *B01D 61/42* | (2006.01) | |
| *C08J 5/22* | (2006.01) | |
| *C02F 101/10* | (2006.01) | |
| *C02F 101/12* | (2006.01) | |
| *H01M 8/1018* | (2016.01) | |
| *C02F 101/16* | (2006.01) | |
| *C02F 103/04* | (2006.01) | |
| *C02F 103/08* | (2006.01) | |
| *C02F 103/32* | (2006.01) | |

(52) U.S. Cl.
CPC .......... *C02F 1/4693* (2013.01); *B01D 61/422* (2013.01); *B01J 41/14* (2013.01); *B01J 47/12* (2013.01); *B05D 3/067* (2013.01); *B05D 3/068* (2013.01); *B05D 5/00* (2013.01); *C02F 1/4695* (2013.01); *C08F 222/1006* (2013.01); *C08F 226/06* (2013.01); *C08J 5/2287* (2013.01); *H01M 8/103* (2013.01); *H01M 8/1058* (2013.01); *H01M 8/1072* (2013.01); *C02F 2101/101* (2013.01); *C02F 2101/106* (2013.01); *C02F 2101/108* (2013.01); *C02F 2101/12* (2013.01); *C02F 2101/163* (2013.01); *C02F 2103/04* (2013.01); *C02F 2103/08* (2013.01); *C02F 2103/32* (2013.01); *C08J 2323/06* (2013.01); *C08J 2323/12* (2013.01); *C08J 2327/06* (2013.01); *C08J 2327/12* (2013.01); *C08J 2327/18* (2013.01); *C08J 2439/02* (2013.01); *H01M 2008/1095* (2013.01); *Y02P 70/56* (2015.11); *Y02W 10/33* (2015.05); *Y02W 10/37* (2015.05)

(58) Field of Classification Search
CPC .... C02F 1/4693; C02F 2101/101; C02F 1/12; C02F 1/106; C02F 1/108; C02F 1/163; B05D 3/067; B05D 3/068; B05D 5/00; C08F 226/06; C08F 222/1006; H01M 8/103; H01M 8/1058; H01M 8/1056; B01J 41/14; B01J 47/12
USPC ........................................................ 204/262
See application file for complete search history.

(56) References Cited

U.S. PATENT DOCUMENTS

| | | | | |
|---|---|---|---|---|
| 2,780,601 A | * | 2/1957 | Blomgren | ............ G01N 31/168 436/42 |
| 2,780,604 A | * | 2/1957 | Clarke | .................. C07C 209/08 204/296 |
| 3,009,895 A | | 11/1961 | Slocombe | |
| 3,549,016 A | | 12/1970 | Rigopulos | |

(Continued)

FOREIGN PATENT DOCUMENTS

| | | |
|---|---|---|
| CN | 1114237 A | 1/1996 |
| CN | 1986613 A | 6/2007 |

(Continued)

OTHER PUBLICATIONS

J.C. Salamone et al., "Polymerization of Vinylpyridinium Salts. XIII. Preparation of CVinyl-N-Methylpyridinium pStyrenesulfonate Charge Transfer Ion-Pair Comonomer", Dec. 31, 1985 (Dec. 31, 1985), XP055104794, Retrieved from the Internet: URL:http://onlinelibrary.wiley.com/store/10.1002/pol.1985.130231210/asset/130231210_ftp.pdf?v-1&t-hs6a53wy&s-e4772bb8720bf774cd920c40734d5b18cad056d1 [retrieved on Feb. 27, 2014] *p. 656, paragraph 7* *p. 658, paragraph 3*.

(Continued)

*Primary Examiner* — Michael Bernshteyn

(57) ABSTRACT

Anion exchange membranes may include a polymeric microporous substrate and a cross-linked anion exchange polymeric layer on the substrate. Anion exchange membranes may have a resistivity of less than about 1.5 Ohm-cm$^2$ and an apparent permselectivity of at least about 95%. The anion exchange membranes may be produced by a unique, two step process.

11 Claims, 2 Drawing Sheets

(56) References Cited

U.S. PATENT DOCUMENTS

| | | |
|---|---|---|
| 3,737,045 A | 6/1973 | Hashimoto et al. |
| 3,926,864 A | 12/1975 | Hodgdon, Jr. |
| 4,231,855 A | 11/1980 | Hodgdon et al. |
| 4,297,431 A | 10/1981 | Sullivan |
| 4,585,833 A | 4/1986 | Domeier |
| 4,704,324 A | 11/1987 | Davis et al. |
| 4,778,601 A | 10/1988 | Lopatin et al. |
| 4,828,772 A | 5/1989 | Lopatin et al. |
| 4,874,567 A | 10/1989 | Lopatin et al. |
| 4,933,405 A | 6/1990 | Evani |
| 5,032,274 A | 7/1991 | Yen et al. |
| 5,039,420 A | 8/1991 | Klein et al. |
| 5,118,717 A | 6/1992 | Hodgdon et al. |
| 5,120,632 A | 6/1992 | Bertrand et al. |
| 5,145,618 A | 9/1992 | MacDonald et al. |
| 5,194,189 A | 3/1993 | Papastavros et al. |
| 5,264,125 A * | 11/1993 | MacDonald ......... B29C 70/504 210/500.35 |
| 5,380,413 A | 1/1995 | Poser et al. |
| 5,401,408 A | 3/1995 | Umemura et al. |
| 5,447,636 A | 9/1995 | Banerjee |
| 5,510,394 A | 4/1996 | Hodgdon |
| 5,714,521 A | 2/1998 | Kedem et al. |
| 5,814,197 A | 9/1998 | Batchelder et al. |
| 5,849,167 A | 12/1998 | Posar |
| 5,868,976 A | 2/1999 | Puglia et al. |
| 5,961,796 A | 10/1999 | Hitchens et al. |
| 6,013,724 A | 1/2000 | Mizutani et al. |
| 6,117,297 A | 9/2000 | Goldstein |
| 6,217,733 B1 | 4/2001 | Hurwitz et al. |
| 6,221,248 B1 | 4/2001 | Lin et al. |
| 6,258,276 B1 | 7/2001 | Mika et al. |
| 6,277,512 B1 | 8/2001 | Hamrock et al. |
| 6,344,584 B2 | 2/2002 | Lin et al. |
| 6,368,486 B1 | 4/2002 | Thompson et al. |
| 6,410,672 B1 | 6/2002 | MacDonald et al. |
| 6,423,205 B1 | 7/2002 | Akahori et al. |
| 6,596,137 B2 | 7/2003 | Nago et al. |
| 6,723,758 B2 | 4/2004 | Stone et al. |
| 6,814,865 B1 | 11/2004 | Arninabhavi et al. |
| 6,828,386 B2 | 12/2004 | MacKinnon |
| 6,830,671 B2 | 12/2004 | Aritomi et al. |
| 6,849,688 B2 | 2/2005 | Hellums |
| 6,851,561 B2 | 2/2005 | Wu et al. |
| 6,924,318 B2 | 8/2005 | Mischi et al. |
| 7,081,484 B2 | 7/2006 | Sugaya et al. |
| 7,087,654 B2 | 8/2006 | MacDonald et al. |
| 7,201,832 B2 | 4/2007 | Yamanaka et al. |
| 7,247,370 B2 | 7/2007 | Childs et al. |
| 7,316,919 B2 | 1/2008 | Childs et al. |
| 7,318,972 B2 | 1/2008 | Highgate |
| 7,368,200 B2 | 5/2008 | Zhu et al. |
| 7,396,465 B2 | 7/2008 | Wu et al. |
| 7,425,583 B2 | 9/2008 | Inoue et al. |
| 7,449,111 B2 | 11/2008 | Hedhli et al. |
| 7,514,481 B2 | 4/2009 | Yandrasits et al. |
| 7,544,278 B2 | 6/2009 | Aminabhavi et al. |
| 7,632,406 B2 | 12/2009 | Wilson et al. |
| 7,649,025 B2 | 1/2010 | Kitamura et al. |
| 7,674,505 B2 | 3/2010 | Kerres et al. |
| 7,740,967 B2 | 6/2010 | Oren et al. |
| 7,790,837 B2 | 9/2010 | McGrath et al. |
| 7,829,218 B2 | 11/2010 | Endo et al. |
| 7,833,644 B2 | 11/2010 | Chokai et al. |
| 7,868,124 B2 | 1/2011 | Balland-Longeau et al. |
| 7,888,397 B1 | 2/2011 | Hibbs et al. |
| 7,893,303 B2 | 2/2011 | Yamakawa et al. |
| 7,901,831 B2 | 3/2011 | Brunea |
| 7,910,236 B2 | 3/2011 | Hommura et al. |
| 7,923,166 B2 | 4/2011 | Fukuta et al. |
| 7,931,995 B2 | 4/2011 | Bahar et al. |
| 7,938,941 B2 | 5/2011 | Kashiwada et al. |
| 7,947,196 B2 | 5/2011 | Lee et al. |
| 7,959,780 B2 | 6/2011 | Hawkins et al. |
| 7,968,663 B2 | 6/2011 | MacDonald et al. |
| 7,977,392 B2 | 7/2011 | MacKinnon et al. |
| 8,075,951 B2 | 12/2011 | Hammond-Cunningham et al. |
| 8,114,550 B2 | 2/2012 | Suzuki et al. |
| 8,349,155 B2 | 1/2013 | Umemura et al. |
| 8,367,267 B2 | 2/2013 | Frey et al. |
| 8,703,831 B2 | 4/2014 | Lin et al. |
| 8,969,424 B2 * | 3/2015 | Lin .................... H01M 8/1018 521/27 |
| 9,023,902 B2 | 5/2015 | Lin et al. |
| 2002/0019448 A1 | 2/2002 | Sugaya et al. |
| 2002/0045085 A1 | 4/2002 | Formato et al. |
| 2003/0024816 A1 | 2/2003 | Aritomi et al. |
| 2003/0105173 A1 | 6/2003 | Sugaya et al. |
| 2004/0175625 A1 | 9/2004 | Hedhli et al. |
| 2004/0241518 A1 | 12/2004 | Yang |
| 2005/0011826 A1 | 1/2005 | Childs et al. |
| 2005/0250919 A1 | 11/2005 | Caneba et al. |
| 2006/0000778 A1 | 1/2006 | Childs et al. |
| 2006/0045985 A1 | 3/2006 | Kozak |
| 2007/0020499 A1 | 1/2007 | Suzuki et al. |
| 2007/0031716 A1 | 2/2007 | Rajendran |
| 2007/0261962 A1 | 11/2007 | Gajek |
| 2008/0023334 A1 | 1/2008 | Nakagawa et al. |
| 2008/0223785 A1 | 9/2008 | Miller et al. |
| 2009/0137757 A1 | 5/2009 | Imuta et al. |
| 2009/0155370 A1 | 6/2009 | Cope et al. |
| 2010/0056650 A1 | 3/2010 | Highgate |
| 2010/0062313 A1 * | 3/2010 | Browning ............... C08J 5/2243 429/492 |
| 2010/0065490 A1 | 3/2010 | Balster et al. |
| 2010/0239946 A1 | 9/2010 | Miyachi et al. |
| 2011/0020730 A1 | 1/2011 | Mizuno et al. |
| 2011/0068002 A1 * | 3/2011 | Lin .................... B01D 67/0006 204/296 |
| 2011/0097645 A1 | 4/2011 | Van Baak et al. |
| 2011/0132762 A1 | 6/2011 | O'Brien et al. |
| 2011/0147308 A1 | 6/2011 | Johnston-Hall et al. |
| 2011/0189586 A1 | 8/2011 | Brunea |
| 2011/0200907 A1 | 8/2011 | Moon et al. |
| 2011/0203990 A1 | 8/2011 | Murphy et al. |
| 2011/0224314 A1 | 9/2011 | MacDonald et al. |
| 2011/0281197 A1 | 11/2011 | Daikoku et al. |
| 2011/0290727 A1 | 12/2011 | Van Engelen |
| 2012/0006685 A1 | 1/2012 | Van Engelen |
| 2012/0014858 A1 | 1/2012 | Rowell |
| 2012/0024697 A1 | 2/2012 | Antheunis et al. |
| 2012/0031834 A1 | 2/2012 | Higa et al. |
| 2012/0035280 A1 | 2/2012 | Jikihara et al. |
| 2012/0248028 A1 | 10/2012 | Antheunis et al. |
| 2012/0248029 A1 | 10/2012 | Antheunis et al. |
| 2012/0248030 A1 | 10/2012 | Antheunis et al. |
| 2012/0248032 A1 | 10/2012 | Van Berchum et al. |
| 2012/0329891 A1 | 12/2012 | Lee et al. |

FOREIGN PATENT DOCUMENTS

| | | |
|---|---|---|
| JP | 63-503074 A | 11/1988 |
| JP | 2000-503898 A | 4/2000 |
| JP | 2001-157823 A | 6/2001 |
| JP | 2005-334263 A | 12/2005 |
| JP | 2006-519273 A | 8/2006 |
| JP | 2008119608 A | 5/2008 |
| JP | 2008-255351 A | 10/2008 |
| JP | 2008288065 A | 11/2008 |
| JP | 2009144041 A | 7/2009 |
| JP | 2009-173786 A | 8/2009 |
| JP | 2009-173828 A | 8/2009 |
| JP | 2009-215499 A | 9/2009 |
| JP | 2009-215500 A | 9/2009 |
| WO | 0193361 A2 | 12/2001 |
| WO | 03008078 A2 | 1/2003 |
| WO | 2004073843 A1 | 9/2004 |
| WO | 2005102503 A1 | 11/2005 |
| WO | 2010007399 A1 | 1/2010 |
| WO | 2010013861 A1 | 2/2010 |
| WO | 2010106356 A1 | 9/2010 |
| WO | 2010106357 A1 | 9/2010 |
| WO | 2011025867 A1 | 3/2011 |
| WO | 2012051608 A1 | 4/2012 |

(56) References Cited

FOREIGN PATENT DOCUMENTS

| WO | 2012051610 A1 | 4/2012 | |
|---|---|---|---|
| WO | WO-2012051608 A1 * | 4/2012 | ............ C02F 1/4693 |
| WO | 2012081026 A2 | 6/2012 | |
| WO | 2013014420 A1 | 1/2013 | |
| WO | 2013052227 A1 | 4/2013 | |

OTHER PUBLICATIONS

Pandey, Ashok K. et el., "Formation of Pore-Filled Ion-Exchange Membranes within Situ Crosslinking: Poly (Vinylbenzyl Ammonium Salt)—Filled Membranes", Journal of Polymer Science Part A: Polymer Chemistry, vol. 39, No. 6, Mar. 15, 2001.

\* cited by examiner

HIGH-PERFORMANCE ANION EXCHANGE MEMBRANES AND METHODS OF MAKING SAME

CROSS-REFERENCE TO RELATED APPLICATIONS

This application is a continuation application of and claims the benefit under 35 U.S.C. § 120 of co-pending U.S. patent application Ser. No. 14/433,063, titled HIGH-PERFORMANCE ANION EXCHANGE MEMBRANES AND METHODS OF MAKING SAME, filed on Apr. 2, 2015, which is a U.S. National Stage Application under 35 U.S.C. § 371 of International Application No. PCT/US2013/031957, titled HIGH-PERFORMANCE ANION EXCHANGE MEMBRANES AND METHODS OF MAKING SAME, filed on Mar. 15, 2013, which claims priority under 35 U.S.C. § 119 to U.S. patent application Ser. No. 61/709,475, titled HIGH-PERFORMANCE ANION EXCHANGE MEMBRANES AND METHODS OF MAKING SAME, filed on Oct. 4, 2012, each of which is incorporated herein by reference for all purposes.

FIELD

Aspects relate generally to anion exchange membranes and, more particularly, to anion exchange membranes having enhanced electrochemical properties.

SUMMARY

In accordance with one or more aspects, a method of making an anion exchange membrane may comprise mixing a tertiary amine monomer with a quaternization agent to produce a functional monomer, mixing a cross-linking agent and a solvent with the functional monomer to form a monomeric solution, and casting the monomeric solution on a polymeric microporous substrate to form the anion exchange membrane.

In accordance with one or more aspects, an anion exchange membrane may comprise a polymeric microporous substrate, and a cross-linked anion exchange polymeric layer on the substrate, the membrane having a resistivity of less than about 1.5 Ohm-cm$^2$ and an apparent permselectivity of at least about 95%.

In accordance with one or more aspects, an electrochemical separation device may comprise at least one anion exchange membrane having a resistivity of less than about 1.5 Ohm-cm$^2$ and an apparent permselectivity of at least about 95%.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
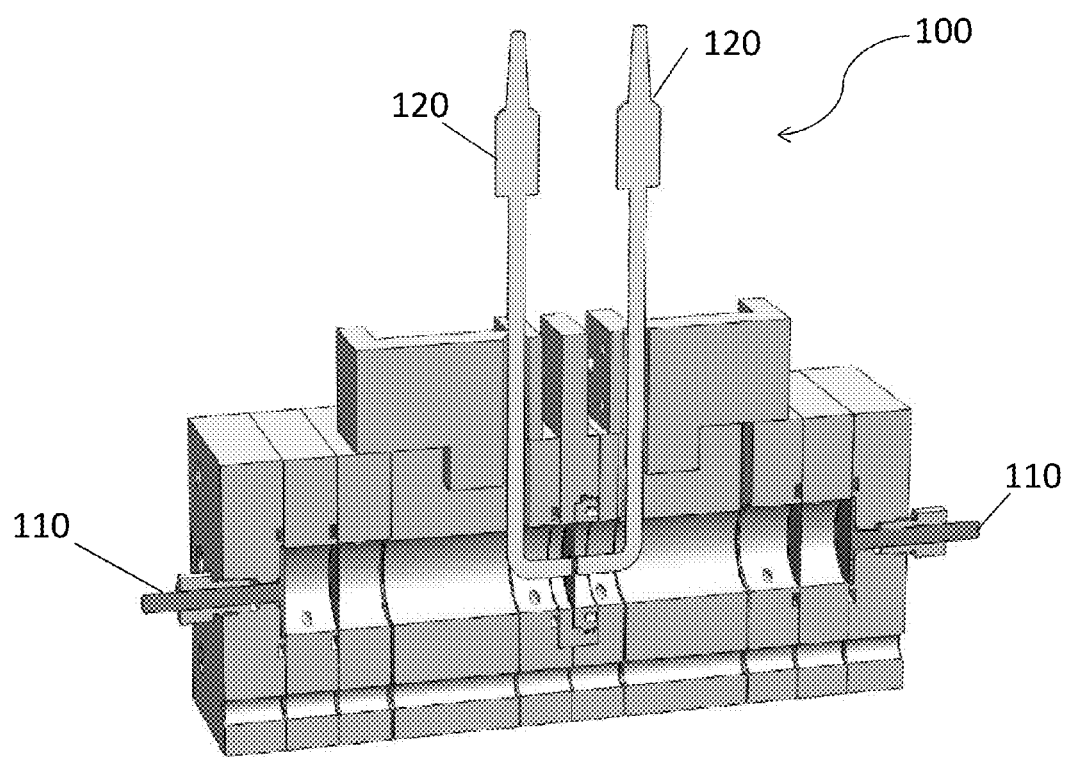
FIG. 1 presents a schematic of an electrochemical test unit used in accordance with one or more accompanying Examples.

Devices for purifying fluids using electrical fields are commonly used to treat water and other liquids containing dissolved ionic species. Two types of devices that treat water in this way are electrodeionization and electrodialysis devices. Within these devices are concentrating and diluting compartments separated by ion exchange membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semipermeable or selectively permeable ion exchange or bipolar membranes.

Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to electrodialysis (ED) and electrodeionization (EDI) devices. Commercially available ED devices are typically of plate-and-frame design, While EDI devices are available in both plate and frame and spiral configurations.

One or more embodiments relate to the composition of ion exchange membranes that may be used in devices that purify fluids electrically, as well as methods of manufacture and use thereof.

Electrochemical separation systems are used to create ultrapure water for the pharmaceutical and semiconductor industries, are used as power generating sources in reverse electrodialysis, as separators in fuel cells, are used in the recovery of metal ions in the electroplating and metal finishing industries, and are in various other applications including the food and beverage industry. Among the most important applications of ion exchange membranes, however, is the desalination of seawater by electrochemical methods.

Seawater is traditionally desalinated by pressure driven methods, and is most commonly accomplished by reverse osmosis. Seawater reverse osmosis however requires extensive pre-treatment of the feed and is an energy-intensive process. Electrochemical desalination has advantages over reverse osmosis in that less pretreatment is required. Though electrochemical methods are often used to treat brackish and waste water, electrochemical methods are still often considered too expensive for seawater desalination.

Seawater has a total dissolved solids content of about 35,000 parts per million (ppm). The majority of the dissolved solids in seawater is sodium chloride, and thus treating seawater predominantly involves removing monovalent ions. Reverse osmosis membranes, however, generally, preferentially remove divalent ions and thus are less efficient at treating seawater than membranes that selectively remove monovalent ions. Electrochemical desalination may have advantages over reverse osmosis desalination because monovalent selective membranes can be used to treat seawater.

Ion exchange membranes can be fabricated to be ion selective. For example, a membrane can be fabricated from a specific precursor such that the resulting membrane preferentially removes a certain ion from a treatment water. Certain industries require water with a particularly low concentration of a specific ion. For example, water flooding used in the oil refinery business must have very low sulfate values, and the semiconductor and pharmaceutical industries require ultra pure water having very low concentrations of boron and silica. The fabrication of ion-selective membranes is thus highly desirable because of their ability to efficiently remove species of interest contained in a treatment water for use in a specific application.

The design of a successful and economical electrochemical separation system, including an electrochemical system for desalinating seawater, is affected by a number of parameters, including the ion selectivity of the membranes, but most importantly, the voltage drop across a pair of ion exchange membranes and the electric power consumed in the desalting process. The properties of the ion exchange membranes used in such systems impact the system efficiency. The development of ion exchange membranes requires an optimization of properties in order to overcome competing effects. Ion exchange membranes for seawater desalination generally must meet four main characteristics to be considered successful. The membranes must have low electrical resistance, high permselectivity, high chemical stability, and good mechanical strength. Of these parameters, low electrical resistance and high permselectivity are of the most importance because they directly affect the energy consumption of an electrochemical separation process.

The electrical resistivity of an ion exchange membrane is an expression of how strongly the membrane resists the flow of electric current. When resistivity is high, more current, and thus more energy, must be applied to the electrochemical cell to facilitate ion transfer across the membrane to perform electrochemical separation. Thus generally, the lower the resistivity of the ion exchange membrane, the more efficient the membrane, and system having said membrane, can perform electrochemical separations. Membrane resistivity is generally expressed in units of resistance by area, for example, ohm-square centimeters, $\Omega.cm^2$.

The permselectivity measures the degree to which a membrane is permeable to counter-ions and impermeable to co-ions. When an electric current is applied to an electrochemical cell having an anion exchange membrane and a cation exchange membrane, specifically referring to the cation exchange membrane for explanative purposes, counter-ions (cations) in solution will cross the cation membrane and theoretically, co-ions (anions) will be rejected by the membrane. In practice however, some anions will cross the cation exchange membrane. The passage of these co-ions across the membrane reduces the overall process efficiency. Thus membranes that have a high permselectivity, that is, are highly permeable to counter-ions and highly impermeable to co-ions, are more efficient than membranes having lower permselectivity.

Seawater desalination generally causes membranes to foul. Ion exchange membranes used in seawater desalination must be able to withstand cleaning by oxidative chemicals, and therefore must also be able to withstand pHs in a range of from about 0 to about 14, for example, a pH in the range of about 2 to about 12. The membranes must also be able to withstand the stress of being handled while being manufactured into modules or other processing devices. The membrane must also have good dimensional stability in operation. Seawater feed can vary in temperature and concentration and the membrane should not swell or shrink excessively when the properties of fluid contacting the membrane change.

In order to be competitive with seawater reverse osmosis desalination, an electrochemical apparatus, such as an ED or EDR, must have membranes with a resistance of less than about 1 ohm-cm$^2$ preferably less than 0.8 ohm-cm$^2$, and most preferably, less than about 0.5 ohm-cm$^2$. Further, the ion permselectivity must be greater than about 90%, more preferably greater than about 95%, and most preferably, greater than about 98%.

The membrane must also have a long service life, be physically strong and chemically durable, and it must be capable of fabrication at low cost. Though thinner membranes will have lower resistance and allow for more membrane area per unit volume of a device, thinner membranes are more susceptible to dimension changes from environmental effects, such as changes in the temperature and concentration of the solution contacting the membrane. Moreover, the development and production of defect-free thinner membranes is more difficult than when a relatively greater thickness is allowed because production of thinner membranes reduces the available margin of error during membrane production.

Ion exchange membranes comprise polymeric materials that facilitate the transport of either positive or negative ions across the membrane. Ion exchange membrane properties, including resistivity and permselectivity, are controlled, in part, by the amount, type, and distribution of fixed ionic groups in the membrane. For example, strong base anion exchange membranes generally comprise ammonium salts, where as weak base anion exchange membranes generally comprise tertiary amines. The ammonium ylides have fixed positive charges that allow anionic species to permeate across the membrane.

Commercially available ion exchange membranes are generally heterogenous membranes. Heterogenous membranes comprise a polymeric layer coated on top of a film and are fabricated by a multi-step process that involves calendaring neutral polymers, a binder, and a plasticizer onto a reinforcing monofilament, such as a woven fabric, at a high temperature and pressure. The calendared monofilament film is then functionalized in a batch process. The polymer coated on the film undergoes a reaction that creates fixed charges in the resulting membrane. For the fabrication of cation exchange membranes, the coated films undergo a batch process to sulfonate the polymer coating. For the fabrication of anion exchange members, the coated film undergoes a process that chloromethylates the polymer coating.

The functionalization step is time consuming, and may take longer than a day, longer than two days, or longer than three days to complete. After functionalization is complete, the membranes are thoroughly washed and rinsed of excess sulfonating, in the case of cation exchange, and chlormethylation in the case of anion exchange, agents. The solvents used to wash the membranes are costly and may be carcinogenic or otherwise hazardous and therefore the rinsing process requires both good ventilation and a solvent recovery process.

Other classes of commercially available ion exchange membranes involve disposing an ion exchange functionalized thermoplastic polymer solution on a releasing surface with, or without, reinforced supporting substrates. The functionalization of ion exchange thermoplastics, such as polysulfone, poly(ether-ether ketone), poly(phenylene oxide), and fluorinated polymers requires multiple steps, is tedious, can result in low yields. Membranes made with this technique generally have low permselectivity and are expensive. Further, because the polymer is not crosslinked, the membranes experience a greater degree of dimensional change when exposed to high salinity gradients during separation processes.

Commercially available membranes are therefore expensive, and the installation of commercially available membranes may be cost-prohibitive and inefficient for large scale commercial desalination installations.

Membranes fabricated by these multi-step processes often have a thickness of about 150 µm to about 200 µm, depending on the type of membrane fabricated. Thicker membranes may be fabricated by using powdered ion exchange resin beads in a hot blending process with a polyethylene binder. The blended polymeric compound is extruded onto a film. Membranes fabricated by coating a film by extrusion have a typical thickness of about 300 µm to about 500 µm. These membranes are also expensive, and their thickness is undesirable for the installation of large scale desalination processes.

In accordance with aspects and embodiments, a homogenous ion exchange membrane and process of fabricating a homogenous ion exchange membrane is disclosed. The fabrication process of the present invention may be a one step process. The process may enable ion exchange membranes to be produced in large quantities, in shorter time periods, and at lower cost.

In accordance with embodiments, reactive monomers may be used to fill the pores of a polymeric microporous substrate. The pore-filling process may be a one step process and may produce membranes having enhanced electrical properties as compared to commercially available membranes. The membranes of the present invention may have a lower area resistivity, and higher permselectivity than commercially available membranes. Heterogenous membranes generally suffer from variations and inconsistencies in electrochemical properties. The process and membranes of the present disclosure may have a more uniform microstructure and may thus provide a higher degree of consistency in the electrochemical properties of like-fabricated membranes. The membranes of the present disclosure may have a permselectivity of greater than about 95% and an area resistivity of less than about $1.5\Omega.cm^2$.

Commercially available membranes are not generally weldable and typically must be kept wet at all times, which makes installation of the ion exchange membranes in an electrochemical device and operation of the device difficult. In accordance with aspects and embodiments, a thermally weldable membrane is provided that can be dried out, re-wet, and re-used. The membranes of the present disclosure may also be thinner than commercially available membranes, and may, for example, have a thickness of less than about 255 µm, less than about 155 µm, less than about 55 µm, and in some embodiments, the membrane may have a thickness of about 20 µm. Thus, the membranes disclosed may allow packing of a larger effective membrane area in a smaller space than would be achievable by commercially available membranes. The membranes of the present disclosure may thus be used to design electrochemical devices having increased productivity. The membranes of the present invention may allow for more versatile product design.

In accordance with aspects and embodiments, a homogenous ion exchange membrane is produced having improved electrochemical properties. The homogenous ion exchange membrane may be produced by the polymerization of monomers. A polymeric microporous substrate may be soaked in a monomer mixture. Typically, when a polymeric microporous substrate is used to fabricate an ion exchange membrane, a polymer mixture coats the substrate. The pores of the substrate may not be filled by the polymers in the mix because the polymers in the mixture have a size much greater than the size of the substrate pores. In accordance with aspects and embodiments, the pores of a polymeric microporous support may be filled by reactive monomers and the pore-filled substrate may be used to produce an ion exchange membrane. Anion exchange membranes may, for example, be fabricated from a substrate filled with a vinylimidazole monomer, such that when the monomer filling the pores is polymerized to form a membrane, the polymerized product comprises fixed charge quaternary amine groups that function as active sites for anion exchange. Cation exchange membranes, may, for example, be fabricated from a substrate filled with a sulfoethyl methacrylate monomer, such that when the monomer filling the pores is polymerized to form a cation exchange membrane, the polymerization product comprises fixed sulfonic acid groups that provide active sites for cation exchange.

The monomers, however, that polymerize to polymers containing fixed charges are generally hydrophilic. Thus, if a monomeric precursor containing quarternary ammonium salt was homo-polymerized to produce an anion exchange membrane, the ammonium ylide groups that facilitate the exchange of anions, would ultimately leach out of the membrane during membrane conditioning or when exposed to treatment solutions. If the polymers having active sites leach out of the membrane, the electrochemical performance of the membrane declines. When preparing ion exchange membranes from monomers, it is thus necessary to polymerize the functional monomer with a cross-linking agent that renders the polymerized product of the functional monomer less hydrophilic. As used herein, a functional monomer is a monomer than can be polymerized to have a fixed charge suitable to function as an active site in an ion exchange membrane. As used herein, a cross-linking agent, or cross-linking monomer, is any monomer capable of copolymerizing with the functional monomer to render the polymerization product less hydrophilic.

In accordance with aspects and embodiments, ion exchange membranes may thus be prepared by the free radical polymerization of two monomers, the functional monomer and the cross-linking monomer. Free radical reactions are difficult to control, however, and often result in inconsistent products. For example, when preparing ion exchange membranes, the hydrophilic and hydrophobic ingredients may separate over time or in response to temperature changes, the mix may turn cloudy, or may prematurely set. Further, run-away reactions may occur, which can lead to safety hazards and loss of time and material.

Other problems associated with controlling free radical polymerization reactions include the homo-polymerization of the water soluble functional monomer, the homo-polymerization of the cross-linking monomer, and low conversion of copolymerization. Low conversion of polymerization leaves a portion of incompletely polymerized monomers, dimers, and oligomers. The homo-polymerized functional monomers and incompletely polymerized monomers, dimers, and oligomers may leach out during the ion exchange membrane conditioning process and may negatively impact the electrochemical performance of the membranes. Area-resistivity may increase and permselectivity may decrease.

In accordance with aspects of the present disclosure, monomers for the fabrication of ion exchange membranes may be selected based on their reactivity ratios. Selecting monomers based on their reactivity ratios may facilitate controlling polymerization reactions and the process of selecting monomers based on their reactivity ratios may enable the fabrication of membranes having enhanced electrochemical properties.

The efficiency of a free radical polymerization of copolymers can be calculated by the mole ratios of the starting monomers to determine their theoretical ion exchange capacities as compared to the experimentally measured properties of a fabricated ion exchange membrane. The measured efficiencies of copolymerization reactions can be used to modify reaction mixtures and fabricate membranes with improved properties.

The properties of fabricated membranes can be measured by ion exchange capacity tests and by spectroscopic analytical methods, such as FTIR, FT-UV, FT-Raman, or NMR spectroscopy. Monomer sequence distributions in a copolymer can often be determined and classified by spectroscopic methods.

The reactivity ratio of two polymers can be determined by comparing the composition of the initially formed copolymer and the initial mixture of monomers. The reactivity ratio of a vinyl monomer copolymerizing with a second monomer is defined by:

$$m_1/m_2 = [M_1(r_1M_1+M_2)]/[M_2(r_2M_2+M_1)]$$

where $m_1$=the mole of monomer 1 entering the copolymer, $m_2$=the mole of monomer 2 entering the copolymer; $M_1$=the mole of monomer 1 in the monomer mix, $M_2$=the mole of monomer 2 in the monomer mix, and $r_1$, and $r_2$ are the monomer reactivity ratios.

The behavior of monomers in copolymerization reactions is especially useful for analyzing the effect of chemical structure on reactivity. Copolymerization reactions facilitate the fabrication of polymer products with specifically desired properties. Homo-polymerization of single monomers cannot produce a wide range of products. Copolymerization, however, provides for the synthesis of a near unlimited number of different products. By varying the nature and relative amounts of two monomer units, a wide variety of copolymers can be produced from a binary monomer combination.

Copolymerization reactions can produce four distinct types of polymers; random, block, alternative, and graft. Spectroscopic analysis can be used to identify the copolymer that results from a copolymerization reaction.

| | |
|---|---|
| Random | ~AABABBBABABBAAABABBAAAAB~ |
| Block | ~AAAAAAAAAAAABBBBBBBBBBBB~ |
| Alternative | ~ABABABABABABABABABABAB~ |
| Graft | ~A-A-A-A-A-A-A-A-A-A-A~ |
| | \| |
| | B |
| | B |
| | B |
| | B |

The Mayo-Lewis copolymerization equations shown below for a two monomer system leads to two types of propagating species—one with $M_1$ at the propagating end and the other with $M_2$ at the propagating end. These can be represented by $M_1^*$ and $M_2^*$, where the asterisk represents the radical as the propagating species.

$$\sim M_1^* + M_1 \rightarrow \sim M_1M_1^* \quad k_{11}$$

$$\sim M_1^* + M_2 \rightarrow \sim M_1M_2^* \quad k_{12}$$

$$\sim M_2^* + M_2 \rightarrow \sim M_2M_2^* \quad k_{22}$$

$$\sim M_2^* + M_1 \rightarrow \sim M_2M_1^* \quad k_{21}$$

The monomer reactivity ratios, $r_1$ and $r_2$, for any monomer pair are the ratios of the rate constants of the different propagation reactions:

$$r_1 = k_{11}/k_{12}$$

$$r_2 = k_{22}/k_{21}$$

From these equations, several limiting cases can be derived:

$r_1 = r_2 \gg 1$: both reactivity ratios very high, the two monomers have no inclination to react to each other except with themselves leading to a mixture of two homo-polymers.

$r_1 = r_2 > 1$: both ratios larger than 1, homo-polymerization of component M_1 is favored but in the event of a cross polymerization by M_2 the chain-end will continue as such giving rise to block copolymer.

$r_1 = r_2 \approx 1$: both ratios around 1, monomer 1 will react as fast with another monomer 1 or monomer 2 and a random copolymer results.

$r_1 = r_2 \approx 0$: both values approaching 0 the monomers are unable to react in homo-polymerization and the result is an alternating polymer.

$r_1 \gg r_2 \gg 1$: In the initial stage of the copolymerization monomer 1 is incorporated faster and the copolymer is rich in monomer 1. When this monomer gets depleted, more monomer 2 segments are added. This is called composition drift.

TABLE 1

Reactivity Ratio of copolymers from binary monomer system.
(Excerpt from Polymer Handbook, $3^{rd}$ Ed. pages 153-226)

| Monomer | Monomer 2 | $r_1$ | $r_2$ |
|---|---|---|---|
| 2-Sulfoethyl methacrylate | Styrene | 0.60 | 0.37 |
| 2-Sulfoethyl methacrylate | Ethyl methacrylate | 2.0 | 1.0 |
| 2-Sulfoethyl methacrylate | Ethyl acrylate | 3.2 | 0.3 |
| Methyl acrylate | Sodium (2-Sulfoethyl methacrylate) | 0.78 | 1.20 |
| Styrene | Acrylic acid | 0.253 | 0.136 |
| Styrene | methyl methacrylate | 0.49 | 0.48 |
| Styrene | 1-vinylimidazole | 9.94 | 0.071 |
| Styrene | 2-Sulfoethyl methacrylate | 0.37 | 0.60 |
| Styrene | 2-Hydroxyethylmethacrylate | 0.44 | 0.54 |
| Styrene | Ethyleneglycol dimethacrylate | 0.28 | 0.98 |
| Styrene | p-Divinyl benzene | 0.26 | 1.18 |
| Styrene | m-Divinyl benzene | 0.65 | 0.60 |
| styrene | Glycidyl methacrylate | 0.54 | 0.16 |
| Styrene | N-vinylcarbazole | 6.0 | 0 |
| Styrene | p-chloromethylstyrene | 0.62 | 1.12 |
| Styrene | N-Methyl-3-vinylcabazole | 0.735 | 1.404 |
| Styrene | 2-vinylpyridine | 0.46 | 0.75 |
| Styrene | 4-vinylpyridine | 0 | 1.04 |
| 2-Hydroxyethylmethacrylate | 2-acrylamido-2-methylpropanesulfonic acid | 0.86 | 0.90 |
| 2-Hydroxyethylmethacrylate | 2-vinylpyridine | 0.56 | 0.64 |
| 2-Hydroxyethylmethacrylate | 3-vinylpyridine | 0.69 | 0.73 |
| 2-Hydroxyethylmethacrylate | 4-vinylpyridine | 0.62 | 0.90 |

TABLE 1-continued

Reactivity Ratio of copolymers from binary monomer system.
(Excerpt from Polymer Handbook, $3^{rd}$ Ed. pages 153-226)

| Monomer | Monomer 2 | $r_1$ | $r_2$ |
|---|---|---|---|
| 2-Hydroxyethylmethacrylate | Methylmethacrylate | 0.63 | 0.83 |
| Methylmethacrylate | 4-vinylpyridine | 0.54 | 0.99 |
| Methylmethacrylate | Ethyleneglycol dimethacrylate | 1.8635 | 0.6993 |
| Sodium styrenesulfonate | Acrolein | 0.047 | 0.260 |
| Sodium styrenesulfonate | α-chloro-acrylate, sodium salt | 1.44 | 0.27 |
| Vinylidene dichloride | N-vinylcarbazole | 0 | 3.6 |
| Vinylidene dichloride | 2-Sulfoethylmethacrylate | 0.22 | 3.6 |
| Vinylidene dichloride | Methacrylic acid | 0.154 | 3.368 |
| Butyl acrylate | Styrene, p-octylamine sulfonate | 0.30 | 2.30 |
| Butyl acrylate | 2-vinylpyridine | 0.11 | 2.59 |
| Butyl acrylate | 4-vinylpyridine | 0.23 | 4.30 |
| Methacrylic Acid | Diethylaminoethylmethacrylate | 0.63 | 2.34 |
| 2-acrylamido-2-methylpropanesulfonic acid | N,N-dimethyl acrylamide | 0.590 | 1.108 |
| Sodium, 2-acrylamido-2-methylpropanesulfonate | Vinyl acetate | 11.60 | 0.05 |
| Sodium, 2-acrylamido-2-methylpropanesulfonate | 2-Hydroxypropyl methacrylate | 1.03 | 0.89 |
| Ethyl acrylate | N-vinylcarbazole | 1.10 | 0.27 |
| Ethyl acrylate | 1,3-divinylimidazolid-2-one | 0.41 | 0 |
| Ethyl acrylate | 1-ethyl-3-vinyl imidazolid-2-one | 0.47 | 0.01 |
| Ethyl acrylate | 2-Sulfoethyl methacrylate | 0.30 | 3.20 |
| Ethyl acrylate | 2-Vinylpyridine | 0.21 | 2.25 |
| Ethyl acrylate | 4-Vinylpyridine | 0.29 | 2.58 |
| Methyl acrylate | N-Vinylcarbazole | 0.530 | 0.049 |
| Methyl acrylate | 1-Vinyl-2-methylimidazole | 1.280 | 0.050 |
| Methyl acrylate | Vinyl butyl sulfonate | 4.14 | 0 |
| Methyl acrylate | p-N,N-dimethylamino-styrene | 0.06 | 0.38 |
| Acrylonitrile | N-Vinylcarbazole | 0.390 | 0.090 |
| Acrylonitrile | Maleic anhydride | 6.0 | 0 |
| Acrylonitrile | N,N-divinyl aniline | 0.246 | −0.006* |
| Methacrylic Acid | Na, 2-sulfoethylmethacrylate | 0.78 | 1.20 |
| Methacrylic Acid | Styrene | 0.550 | 0.210 |
| Methacrylic Acid | Diethylaminoethylmethacrylate | 0.63 | 2.34 |
| Methacrylic Acid | Sulfolanylmethacrylate | 0.810 | 0.810 |
| Methacrylic Acid | Glycidylmethacrylate | 0.98 | 1.20 |
| Methacrylic Acid | Vinyl diethyl phosphonate | 1.90 | 0.15 |
| Methacrylic Acid | 2-Vinylpyridine | 0.58 | 1.69 |
| Methacrylic Acid | o-Chlorostyrene | 0.622 | 0.101 |
| N-Vinylpyrrolidone | 1-vinylimidazole | 0.160 | 0.960 |

*Artifact negative value considered the r value is approaching zero.

Table 1 lists the reactivity ratio values determined for some common monomers. Table 1, however, is incomplete and does not include all monomers of interest. Without experimental data, which is time consuming and difficult to collect, it is difficult to determine how two monomers will co-polymerize. There may, however, be data on how monomers of interest react with other monomers having known properties.

In accordance with aspects and embodiments, data from a single monomer may be used to produce derivative reactivity ratios of monomers of interest where reactivity data is otherwise unavailable. The derivative reactivity ratios obtained may be used to assist in the selection of monomers for the fabrication of ion exchange membranes having enhanced electrochemical properties. A derivative reactivity ratio of a monomer can be created by normalizing published reactivity data with a polymer having known properties and comparing the normalized value to the published value. For example, styrene is a very hydrophilic monomer and can be used to produce a normalized reactivity ratio that may gauge how a functional monomer or neutral monomer may react with a hydrophobic monomer, such as a cross-linking agent. Table 2 presents the styrene-normalized reactivity ratios of monomers of interest for membrane fabrication.

TABLE 2

| Monomer S | Monomer 2 | | $r_s$ | $r_2$ | $r_2/r_s$ |
|---|---|---|---|---|---|
| Styrene | p-Divinyl benzene | p-DVB | 0.26 | 1.18 | 4.54 |
| Styrene | m-Divinyl benzene | m-DVB | 0.65 | 0.60 | 0.92 |
| Styrene | 2-Hydroxyethyl-methacrylate | HOEMA | 0.44 | 0.54 | 1.23 |
| Styrene | 2-Sulfoethyl methacrylate | 2-SEM | 0.37 | 0.60 | 1.62 |
| Styrene | 1-vinylimidazole | VI | 9.94 | 0.071 | 0.0007 |
| Styrene | N-vinylcarbazole | NVK | 6.0 | 0 | 0 |
| Styrene | p-chloromethylstyrene | VBC | 0.62 | 1.12 | 1.81 |
| Styrene | Acrylic Acid | AA | 0.253 | 0.136 | 0.54 |
| Styrene | methylmethacrylate | MMA | 0.49 | 0.48 | 0.98 |
| Styrene | glycidylmethacrylate | GMA | 0.54 | 0.16 | 0.30 |
| Styrene | Ethyleneglycol dimethacrylate | EGDM | 0.28 | 0.98 | 3.50 |

By comparing the styrene-normalized reactivity ratios ($r_s$) to $r_2$ of functional, cross-linking, and neutral polymers, conclusions can be drawn regarding the reactivity of the monomers. For example, if the styrene-normalized derivative reactivity ratio ($r_2/r_s$) is greater than about one, monomer 2 may have an equal tendency of reacting to another monomer and itself. If, for example, the ratio is much greater than 1, the monomer may have a much greater tendency to react with itself than with another monomer. If the ratio is less than about one, less than about 0.5, or even less than about 0.2, monomer 2 may have a greater tendency to copolymerize with another monomer than itself. Generally, the $r_2/r_s$ value of a monomer is considered a low $r_2/r_s$ value if the ratio is less than about 1.3, less than about 1.0, and more preferably, less than about 0.6.

In accordance with aspects and embodiments, a styrene-normalized derivative reactivity ratio may be used to select monomers to copolymerize for the fabrication of an ion exchange membrane and the styrene-normalized derivative reactivity ratio may further assist in optimizing the composition of the selected monomer mix.

When fabricating an ion exchange membrane with a cross-linking agent having a styrene normalized reactivity ratio higher than one, which indicates that the cross-linking agent is likely to homo-polymerize, it is important that the reaction be altered to limit homo-polymerization. By limiting or eliminating homo-polymerization, the electrochemical performance of the produced membranes may be enhanced.

Homo-polymerization may be controlled by adding additional monomers to the functional monomer-cross-linking agent mix. A monomer having an $r_2/r_s$ value of less than about one may be added to the mix to start the copolymerization of the polymer chain. Adding an additional monomer with a low $r2/r_s$ value may facilitate the formation of alternative or random copolymers and thereby limit or eliminate homo-polymerization.

For example, 2-SEM may be used to fabricate a cation exchange membrane having sulfonic acid active sites for cation exchange. The $r_2r_s$ value of 2-SEM is greater than one and therefore indicates a likelihood for 2-SEM to homo-polymerize. The homo-polymerized polymerization product of 2-SEM will be hydrophilic. A cross-linking monomer must be copolymerized with the 2-SEM to render the resulting membrane hydrophobic to ensure the sulfonic acid groups do not leach out of the fabricated membrane.

p-DVB and m-DVB are cross-linking agents. Though m-DVB has an $r_2/r_s$ value of less than one, which is considered a "low" $r_2/r_s$ value as the term is used herein, m-DVB is commercially only available in a mixture of m-DVB and p-DVB, and the high purity grade DVB commercially available generally comprises about 70% m-DVB and 30% p-DVB. Thus when using DVB as a cross-linking agent, DVB may have an $r2/r_s$ value that is greater than, or much greater than one. This indicates that DVB has a high tendency to homo-polymerize and therefore less DVB should be used in the monomer mix. Some amount of DVB must be used to co-polymerize the 2-SEM, however, additional monomers, for example, neutral monomers can be added to the mix. Neutral monomers are defined herein as monomers with a styrene-normalized derivative reactivity ratio of less than about 1.3, less than about 1.0, less than about 0.5, or even less than about 0.20. The addition of a neutral monomer may facilitate the production of a more random copolymer product. Thus, by adding for example, acrylic acid (AA), which has an $r2/r_s$ value of 0.54, the resulting cation exchange membrane fabricated from 2-SEM, DVB, and AA may have enhanced electrochemical properties as compared to a cation exchange membrane fabricated from 2-SEM and DVB in the absence of a neutral monomer.

The same principles can be applied to the fabrication of anion exchange membranes. For example, 1-vinylamidazole (VI) may be used to fabricate an anion exchange membrane having tertiary or quaternary amine groups that function as active sites for anion exchange. Based on the near zero $r_2/r_s$ value, VI is more likely to polymerize with a different monomer rather than with itself. By further selecting a cross-linking monomer with a low $r_2/r_s$ value, an anion exchange membrane with excellent electrochemical properties can be achieved.

When, for example, VI is copolymerized with a cross-linking agent having an $r_2/r_s$ value that is greater than 1, such as VBC, a neutral monomer, such as HOEMA, glycidyl methacrylate, or methyl methacrylate, can be added to the monomer mix to fabricate an anion exchange membrane with superior electrochemical properties than an anion exchange membrane fabricated from VI and VBC, alone.

In the event that a high $r_2$ or a high $r_2/r_s$ crosslinking agent is selected, an additional monomer having a low $r_2$ or low $r_2/r_s$ value can be added to help achieve a higher degree of co-polymerization. In some non-limiting embodiments, monomers that may improve the resulting properties of the membrane may include hydroxyethylmethacrylate, glycidyl methacrylate, methyl methacrylate, ethyl methacrylate, butyl methacrylate, hydroxyethylacrylate, glycidyl acrylate, methyl acrylate, ethyl acrylate, butyl acrylate, acrylic acid, methacrylic acid.

In accordance with embodiments, the product of the reactivity ratio of two monomers, or the product of the styrene-normalized derivative reactivity ratio of two monomers, can be used to determine desirable membrane compositions. A product of reactivity ratios of about 1 indicates that the copolymer will be a random copolymer. A product of reactivity ratios of about 0 indicates that the resulting copolymer will be an alternative copolymer. The same principle can be applied to the product of the styrene normalized derivative reactivity ratios, $[r_2/r_s]$, of a first monomer and $[r_2/r_s]_2$ for a second monomer. Thus, it is most desirable to have the product of the reactivity ratios of two monomers to be near 1 or near zero, such as less than about 0.6 or in the range of about 0.7 to about 1.3. In accordance with some embodiments, the product of the reactivity ratio of the two monomers may be less than about 0.3 or in the range of between about 0.9 to 1.1. In accordance with aspects and embodiments, polymeric microporous substrates may be used to produce ion exchange membranes from monomer mixes. The monomer mix is selected, in part, based on the reactivity ratios, the styrene-normalized reactivity ratios, and the styrene-normalized derivative reactivity ratios of monomers.

In accordance with aspects and embodiments, functional monomers may be selected so that the resulting ion exchange membrane comprises active sites that selectively remove certain impurities. For example, an anion exchange membrane may be fabricated from monomers such that the resultant membrane selectively removes at least one of nitrate, sulfate, perchlorate, boron, silica or anionic selenium.

The selected monomers are mixed, and in some embodiments, mixed in a solvent system. The substrate may then be wet with the monomer mix. The monomer mix may be allowed to fill the pores of the substrate, and the wet or saturated substrate may then be cast into an ion exchange membrane. The casting process used to fabricate membranes may include application of a vacuum, application of a positive pressure, application of ultraviolet radiation, heat, or any other process sufficient to solidify the mix on and in the substrate.

In accordance with one or more embodiments, a polymeric microporous substrate may comprise at least one of polypropylene, high molecular weight polyethylene, ultrahigh molecular weight polyethylene, polyvinyl chloride, polyvinylidene difluoride, and polytetrafluoroethylene. A thickness of the polymeric microporous substrate may be between about 20 microns and about 255 microns. In some embodiments, it may be less than about 155 microns. In other embodiments, it may be less than about 55 microns. The resulting membrane may have a thickness that is substantially the same as the polymeric substrate.

Other factors in addition to the reactivity ratios of monomers will affect the outcome of a copolymerization reaction. The type of initiator used, the polarity of solvents, temperature, relative humidity, the viscosity of the monomer mixture, the method of stirring during polymerization, the electron withdrawing or electron releasing nature of the pendant functional groups of the final monomer, and polarity all may affect polymerization reactions.

In addition to having high permselectivity and low resistivity, ion exchange membranes should also have low water transport, also referred to herein as water loss, or internal leak. The water transport of an ion exchange membrane refers to the degree to which water can permeate through the membrane. Water loss in ion exchange membranes may reduce the amount of product produced by up to about 10%. Water loss in ion exchange membranes thus reduces the efficiency of electrochemical separation processes and increases the amount of energy, and thus the cost, of such processes.

The water loss of an ion exchange membrane may correlate to the amount of water present in the membrane. The amount of water present in the membrane may be controlled by the degree of cross-linking in the polymerized product. Cross-linking monomers may be selected to control cross-linking such that the resulting polymerization product has a lower water content and the membrane has a lower water loss.

In accordance with aspects and embodiments, a cation exchange membrane and a method of fabricating a cation exchange membrane is disclosed that may reduce internal leak as compared to commercially produced membranes.

Homogenous anion exchange membranes and more specifically, strong base anion exchange membranes, are conventionally produced in a single step process involving a functional tertiary amine monomer. The monomer is quarternized and polymerized in a single solution, resulting in a copolymer having quarternary amines. The quaternary amines provide a fixed charge that facilitates the transport of anionic species across the membrane.

In accordance with aspects and embodiments, the electrochemical properties of an anion exchange membrane can be improved by modifying the fabrication process. Membrane resistivity and permselectivity can be increased by controlling the polymerization process to minimize void space to increase molecular packing and by reducing the degree of cross-linking.

In an embodiment of the present disclosure, an anion exchange membrane may be fabricated from a unique, two step process. The two step process disclosed may control the polymerization process to avoid free space in the three-dimensional microstructures in the anion exchange membrane and thus improve the resulting membrane's electrochemical properties. The two step process disclosed may produce anion exchange membranes capable of desalinating seawater at a lower energy consumption than possible when using anion exchange membranes fabricated from the traditional, one step process. Further, the fabrication methods of the present disclosure may reduce the cost of producing the improved anion exchange membranes.

In accordance with aspects and embodiments, a weak base monomer, a monomer having tertiary amines, is quarternized by a quaternization agent. The quaternization process is completed in situ at room temperature. The quaternization reaction is allowed to proceed to completion. The resulting solution comprises a quaternary amine monomer, which is a strong base functional monomer. A cross-linking agent is added to the solution after quaternization is complete, and the strong base functional monomer is co-polymerized with the cross-linking monomer to produce a co-polymerized product.

In accordance with aspects and embodiments, quaternizing the weak base monomer in a first step independent of a second, cross-linking step, allows the tertiary amine weak base sites to be fully chloro-alkylated or chloro-acylated by the quaternization agent. Allowing the quaternization reaction to occur separately from the cross-linking polymerization reaction better utilizes the quaternization agent and may lower the cost of membrane fabrication. In addition, the two step process disclosed may also yield superior anion exchange membranes than an anion exchange membrane fabricated by traditional methods. Allowing the weak base sites to fully chloro-alkylate or chloro-acylate, may produce a membrane having a lower area resistance than anion exchange membranes fabricated in traditional, single step, synthesis.

In accordance with aspects and embodiments, anion exchange membranes may be fabricated from a continuous two step process. In a first step, a weak base monomer (shown here as a vinylamidazle) is quaternized by a quaternization agent, RX, to form an intermediate product (vinylimidazole Quat.):

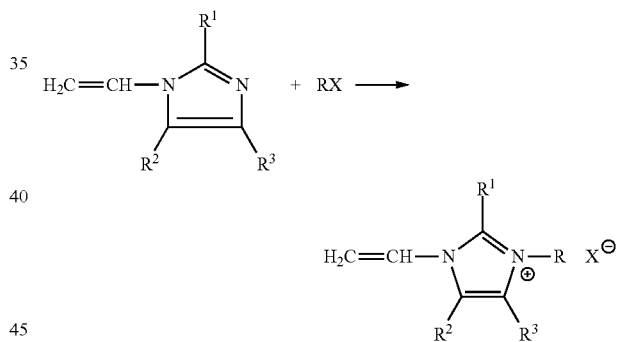

Where R1, R2, and R3 are identical or different and are H, C1-C4-alkyl monomers of the formula, and where R is a benzyl or alkyl and X is a halide, such as fluoride, chloride, bromide, or iodide.

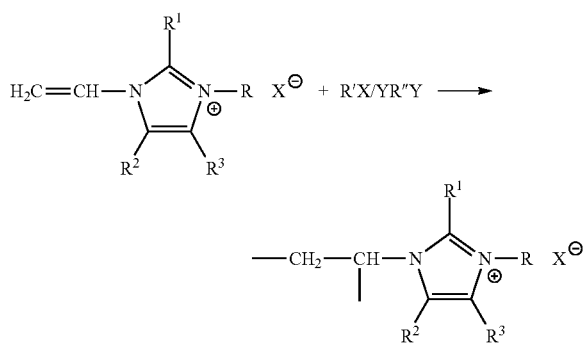

In a second step, the anion exchange membrane is formed by polymerizing the intermediate Quat product with a cross-linking agent R'X or YR"Y to open the vinyl chain and co-polymerize with the cross-linking chains (not shown). The reaction takes place in a solvent system (not shown).

Where R'X is vinylbenzyl chloride or a like monomer, as listed herein, and YR"Y is dichloro-butane or a like monomer, as listed herein.

In accordance with non-limiting aspects and embodiments, the quarternary ammonium salt monomers used to form the anion exchange membranes of the present disclosure may be derived from 1-vinylimidazole, 2-methyl- 1-vinylimidazole, 9-vinylcarbazole, N-ethyl-2-vinylcarbazole, 2-vinylpyridines, 4-vinylpyridine and mixture thereof, and the like vinyl-heterocyclic monomers.

The quaternization agent, RX, used to quaternize the tertiary monomers may be benzyl chloride, benzyl bromide, benzyl iodide, p-dichlorobenzene, m-dichlorobenzene, 1,4-dichloro-2-nitrobenzene, 3-(Benzyloxy)benzyl chloride, 4-(Benzyloxy)benzyl chloride 2-(Trifluoromethyl)-benzyl chloride, 3-(Trifluoromethyl)benzyl chloride, 4-(Trifluoromethyl)benzyl chloride, 1-chlorohexane, 1-chloropentane, 1-chlorobutane, 1-chloropropane, 1,6 dichlorohexane, 1,5-dichloropentane, 1,4-dichlorobutane, 1,3-dichloropropane, 1-bromohexane, 1-bromopentane, 1-bromobutane, 1-bromopropane, 1,6-dibromohexane, 1,5-dibromopentane, 1,4-dibromobutane, 1,3-dibromopropane, 1-iodohexane, 1-iodopentane, 1-iodobutane, 1-iodoopropane, 1-iodoethane, 1-iodidemethane, 1,6-diiodohexane, 1,5-diiodorpentane, 1,4-diiodobutane, 1,3-diiodopropane, and the like.

The monomer, R'X or YR"Y, selected to provide cross-linking between the quaternary ammonium salt monomer may be vinylbenzyl chloride, divinylbenzene, ethyleneglycol-dimethacrylate, p-dichlorobenzene, m-dichlorobenzene, 1,4-dichloro-2-nitrobenzene, 1,6 dichlorohexane, 1,5-dichloropentane, 1,4-dichlorobutane, 1,3-dichloropropane, 1,6-dibromohexane, 1,5-dibromopentane, 1,4-dibromobutane, 1,3-dibromopropane, 1,6-dibromohexane, 1,5-dibromopentane, 1,4-dibromobutane, 1,3-dibromopropane, 1,4-butanediol dimethacrylate, 1,4-butanediol diacrylate, 1,6-hexanediol diacrylate, Pentaerythritol triacrylate, divinyl benzene, trimethylolpropane triacrylate, trimethylolpropane trimethacrylate, ethoxylated (n) bisphenol A di(meth)acrylate (n=1.5, 2, 4, 6, 10, 30), ethoxylated (n) trimethylolpropanetri(meth)Acrylate (n=3,6,9,10,15,20), propoxylated(n) trimethylolpropane triacrylate (n =3,6), and the like.

The cross-linking monomer may provide a degree of cross-linking in a range from about 0% to about 100%. A low degree of cross-linking coupled with a high degree of copolymerization is desired, such that the resulting membrane is hydrophobic with a low degree of homo-polymerized hydrophilic functional monomers, but also consists of an adequate amount of functional monomer to facilitate efficient electrochemical separations.

The polymerization reaction may take place in a solvent, or solvent system, comprising dipropyleneglycol, n-propanol, 2-propanol, 1-methyl-2-pyrrolidinone, combination thereof and other solvent systems suitable for polymerization reactions, and more specifically, free radical co-polymerization.

The free radical polymerization reaction may be initiated by a chemical initiator. The initiator may be benzoyl peroxide (BPO), 2,2'-azobisisobutyronitrile (AIBN, Vazo64), 2,2'-azobis(2-methylpropionamidine)dihydrochloride (V-50), 2,2'-Azobis[2-(2-imidazolin-2-yl)propane]dihydrochloride (Va-044), 2,2'-Azobis[2-(2-imidazolin-2-yl)propane] (Va-061), Dimethyl 2,2'-azobis(2-methylpropionate) (V-601). Free radical polymerization may also be initiated by thermal decomposition, photolysis, persulfate dissociation, ionizing radiation, electrolysis, sonication, and other techniques that cleave a bond to create a free radical. An inhibitor, such as 4-methoxyphenol (MEHQ) or tert-buticateol, may also be used to control the reaction.

In accordance with aspects and embodiments an additional monomer may be added to the monomer solution comprising the intermediate quat. product and the cross-linking monomer. The additional monomer may be selected based on its $r_2/r_s$ value. In the event that a high $r_2$ or a high $r_2/r_s$ crosslinking agent is selected, an additional monomer having a low $r_2$ or low $r_2/r_s$ value can be added to help achieve a higher degree of co-polymerization. In some non-limiting embodiments, monomers that may improve the resulting properties of the membrane may include hydroxyethylmethacrylate, glycidyl methacrylate, methyl methacrylate, ethyl methacrylate, butyl methacrylate, hydroxyethylacrylate, glycidyl acrylate, methyl acrylate, ethyl acrylate, butyl acrylate, acrylic acid, methacrylic acid. Adding a third monomer with a low $r_2/r_s$ value may improve the electrochemical properties of the anion exchange membranes.

The electrochemical characteristics of the ion exchange membranes fabricated in accordance with aspects and embodiments may be easily measured by using an electrochemical cell. The performance of ion exchange membranes, including the resistivity and permselectivity may be measured and compared using a small piece of sample in a bench top electrochemical test unit.

Figure 2:
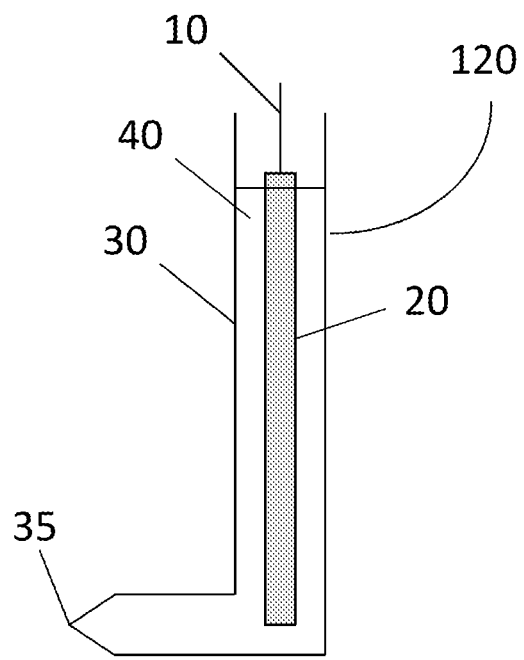
FIG. 2 presents a schematic of the electrodes of the electrochemical test unit of FIG. 1.

For example and referring to FIG. 1, electrochemical test unit 100 has electrode pair 110. Electrodes 110 may be platinum disks. One electrode functions as a cathode and the other functions as an anode. Electrochemical test unit 100 has a pair of reference electrodes 120. Referring also to FIG. 2, reference electrodes 120 may comprise a silver wire 10 with a silver chloride coating 20. Wire 10 with coating 20 is disposed in glass tubing 30. Glass tubing 30 has porous tip 35 that allows electrode solution 40 to flow out of tubing 30 very slowly.

To take measurements, the cell is filled with a test solution and a current is applied to the cell. The conductivity of the test solution is calculated from the measured voltage drop between the two reference electrodes at the applied current.

A sample of an ion exchange membrane of interest is then placed between the reference electrode and the voltage drop across the membrane is measured by the reference electrodes at the applied current. The resistance of the membrane is calculated as a function of the total resistance less the solution resistance. The permselectivity is calculated as a function of the measured voltage drop, solution temperature, and concentration of the test solution on the two sides of the membrane in the cell.

Existing electrochemical water treatment systems may be retrofitted by providing and implementing the membranes discussed herein fabricated in accordance with one or more embodiments. For example, an existing water treatment system comprising an electrochemical separation device may be retrofitted with one or more of the membrane enhancements and modifications discussed herein. The modifications and enhancements to the process of making ion exchange membranes may be used individually, or in combination.

The improved membranes and processes of the present disclosure may be able to treat water more efficiently and with total lower capital cost than traditional water treatment systems providing and implementing the modifications discussed herein in accordance with one or more embodiments.

In some embodiments, a fuel cell may include at least one anion exchange membrane as described and/or made herein. In other embodiments, an electrochemical separation device may comprise at least one anion exchange membrane described herein having a resistivity of less than about 1.5 Ohm-cm$^2$ and an apparent permselectivity of at least about 95%. In some non-limiting embodiments, the electrochemical separation device may comprise an electrodialysis cell or an electrodeionization cell.

In accordance with one or more embodiments, a desalination system, wastewater treatment system, onsite acid/base generation system, or water treatment system for the food and beverage industry may include at least one electrochemical separation device in accordance with one or more embodiments. In accordance with one or more embodiments, an electrochemical separation device may include at least one anion exchange membrane configured for ion selective removal of nitrate, sulfate, perchlorate, boron or anionic selenium.

The function and advantages of these and other embodiments can be further understood from the examples below, which illustrate the benefits and/or advantages of the one or more systems, methods, and techniques but do not exemplify the full scope of the invention. The standard operating procedures used to fabricate ion exchange membranes and the standard operating procedures used to collect data on the resulting membranes are detailed below.

STANDARD OPERATING PROCEDURES

Standard Ion Exchange Membrane Fabrication Procedures

Ion exchange membranes were fabricated by polymerizing various monomer solutions on polymeric microprous substrates. The microporous substrates used to fabricate the membranes of the present invention were polyethylene (PE) films, high density polyethylene (HDPE) films, ultrahigh molecular weight polyethylene (UHMWPE) films, and polypropylene (PP) films.

The substrates had a porous structure having pores in a size of from about 100 nm to about 10,000 nm and about 20% to about 90% porosity. Sandwiched polymer films with differently structured layers were investigated to accommodate different solution penetrations. Monofilament and multifilament yarns, staple yarns, woven fabrics, wet-laid, and melt spun bonded and non-bonded, non-woven fabric sheets ranging from about 100 micrometers to about 1 mm were also investigated and found to be suitable substrates. A list of preferred substrates and their properties are listed in Table 3 below.

TABLE 3

Specification of Preferred Substrates

| Abbr. | Trade name | Manufacturer | Material | Rated pore size | Thickness microns | Porosity % |
|---|---|---|---|---|---|---|
| AP H6A | APorous lots: H6A or NS7 | APorous Billerica, MA | HDPE | 0.1 | 52 | 68 |
| TK20 | Teklon HPIP20 | Entek Lebanon, OR | UHMWPE | | 20 | 48 |
| TK32 (Bi) | Teklon HPIP32Bi | Entek Lebanon, OR | UHMWPE | | 32 | 48 |
| TK32 | Teklon HPIP32 | Entek Lebanon, OR | UHMWPE | | 32 | 48 |
| S16P05A | Solupor 16P05A | Lydall Filtration Rochester NH | UHMWPE | 0.5 | 60 & 115 | 83 & 85 |
| S16P10A | Solupor 16P10A | Lydall Filtration Rochester NH | UHMWPE | 0.9 | 120 | 85 |
| EK2045 | Celgard | Celgard | UHMWPE | 0.097 | 20 | 45 |
| EZ2590 | Celgard | Celgard | PP | 0.1 | 26 | 66 |

Polymeric microporous substrates were die-cut into discs having a diameter of about 4.3 cm. Clear polyester (PET) films having a 3 mm thickness were die cut into discs having a size of about 5 cm to about 10 cm and were used as dividers between substrates to insulate the substrates from contacting air and to prevent the different substrate materials from adhering to each other during thermoset curing operations. An aluminum weighting boat having a diameter of about 10.5 cm was used to facilitate the fabrication of the membranes.

Specific monomer mixtures of interest were poured into the aluminum boat. A PET disc was placed in the boat and a piece of substrate was layered on top of the PET disc. Sufficient time was allowed for the monomer solution to wet the substrate. Air bubbles were smoothed out from the substrate completely before a second layer of PET film was placed on top of the wetted substrate.

This procedure provided for more than 10 layers of substrate sandwiched between layers of PET to be wetted in about 8 gram of monomer mixture. Alternatively, the substrates were pre-wetted in a separate container by first soaking the substrate in the monomer solution. A vacuum and mild heating at less than about 40° C. were used to degas the wetted substrates, and were used independently and in conjunction with one another with efficacy.

Polymerization of the monomer solution on the substrate was then initiated by the application of pressure and heat to form ion exchange membranes. The PET-wetted substrate layers were placed in an air-tight container and the container was filled with nitrogen gas to provide a positive pressure. Heat was then applied to the container by placing it in an oven pre-set at 80° C. The PET-substrate layers were heated for about 10 to about 30 minutes. Alternatively, polymerization was also initiated by exposure to ultraviolet light with a wavelength of about 100 nm to about 400 nm.

The monomer solution was exposed to conditions sufficient to cause the solution to solidify. After the solution was observed to have solidified, the PET-substrate layers were disassembled and the fabricated ion exchange membranes were placed in a 0.5 NaCl solution for conditioning at about 40° C. to about 50° C. for about 30 minutes to about 12 hours before their area resistivity and permselectivity were tested.

Standard Procedures for Measuring Membrane Area Resistivity and Apparent Permselectivity After membranes were fabricated in accordance with aspects and embodiments, their electrochemical properties were measured. A Solartron 1280 electrochemical measurement unit, offered by Solartron Analytics, was used to measure the apparent permselectivity and resistivity of the fabricated membranes. These values were then compared to standard, commercially available membranes.

The Solartron 1280 has the configuration of electrochemical test unit 100 shown in FIG. 1. The cylindrical path of the Solartron 1280 cell had a controlled cross sectional area of 7.0 cm². Reference electrodes 120 were platinum electrodes and were used to apply current across the cell. Reference electrodes 120 were fabricated in the lab by creating an electrochemical cell comprising a platinum wire cathode and a silver wire anode 10 filled with a 0.1 HCL solution. Current was supplied to the cell by a power supply and an ammeter. After about 10 minutes at a current of about 2-3 milliamps (mA), silver wire 10 began to turn black, indicating the formation of silver chloride layer 20 on the surface of silver wire 10. Reference electrodes 120 were newly fabricated for each experiment.

The fabricated silver/silver chloride wire was disposed in glass tubing 30 having porous tip 35. Glass tubing 30 had a diameter of about ¼ inches and was filled with 1.0 KCL electrode solution. Electrode solution was added about every 20 minutes to the electrodes to compensate for electrode solution 40 that leaked through porous tips 30 of electrodes 120.

Prior to taking measurements, the reference electrode horizontal positions were set by a pair of screws to ensure precise dimensional control between the two reference electrodes. Precise dimensional control is essential in accurately calculating resistance measurements and also ensures that the electrode tips do not damage the membrane samples. To set up the reference electrode positions, a rigid plastic disk was used in place of a membrane. The reference electrodes were positioned such that the electrode tip touched the plastic disk. Once proper placement was achieved, the reference electrodes were fixed by a pair of screws adjusted to touch against the wall of the sample slider.

The plastic disc was then removed and test solution measurements were taken in the absence of a membrane sample. The test solution was generally 0.50 NaCl. The voltage drop between and current density between the two reference electrodes was recorded at an applied current of about 10 Ma to about 50 Ma and a distance of about 1.00 cm. From these measurements, the conductivity of the solution was obtained. The solution conductivity was compared to the measurement taken by a conductivity meter to ensure accuracy.

The conductivity, C, of the solutions in the cell can be expressed as $$C = \frac{1}{\rho} = \frac{L}{RA} = \frac{L}{\frac{U}{I} \times A}$$

Where L is the distance between reference electrodes, U is the voltage measured between the electrodes at distance L, I is the current being drawn, and A is the cross-sectional area of the cell.

For example, for a 0.500 M NaCl solution when 10.00 mA of current was being drawn and a voltage drop of 33.1 mV was measured across membranes, spaced 1.0 cm apart, the conductivity of the solution was:

$$C = \frac{1}{\rho} = \frac{L}{RA} = \frac{L}{\frac{U}{I} \times A} = \frac{1.00 \text{ cm}}{\frac{33.1 \text{ mV}}{10.0 \text{ mA}} \times 7.00 \text{ cm}^2} = 0.0432 \text{ S/cm}$$

After solution conductivity was measured, a sample of membrane was placed in the Solartron 1280 and the voltage and current density were again measured. The resistance of the membrane is the total resistance measured less the solution resistance measured in the absence of a membrane sample. The area resistivity, R, can thus be expressed as:

$$R = \frac{(T_r - S_r)}{I} \times A$$

Where R equals area resistivity, $T_r$ is the total measured resistivity, $S_r$ is the measured resistivity of solution, I is the measured current being drawn between the reference electrodes, and A is the area of the membrane.

For example, a standard commercially available cation exchange membrane (CXM) offered by Astom Corporation of Japan was placed in the Solartron 1280 cell and a potential of 38.0Mv was measured across the membrane. The Solartron 1280 cross-sectional area and thus the cross sectional area of the CXM was 7.0 cm². The solution absent a membrane sample had a resistivity of 33.1 mV and a current of 10.00 mA. The CXM thus has an area resistivity of:

$$R = \frac{(38.1 - 33.1)\text{mV}}{10.0 \text{ mA}} \times 7.00 \text{ cm}^2 = 3.42 \ \Omega \cdot \text{cm}^2$$

The Permselectivity of a cation (+) or anion (−) membrane, $T_\pm$ is obtained by:

$$V = (2T_\pm - 1)\frac{RT}{F} \ln \frac{a_L}{a_R}$$

Where V is the measured voltage by the reference electrodes, R is the gas constant (8.314 Joule·K⁻¹·mole⁻¹), where T is the Kelvin temperature of solution, F is Faraday's constant (96480 coulomb/mole) and $a_R$ and $a_L$ are the activities of solution on the right and left sides of the membrane, respectively. Activity, a, is a function of concentration, C:

$a=\gamma(C)$;

Where γ is the activity coefficient of solution. The activity coefficient of the solution can be calculated using known models, such as the Debye-Hückel Equation, the Extended Debye-Hückel Equation, and the Davies Equation.

The area-resistance and apparent permselectivity of the polymeric microporous substrates were measured and compared before being used to fabricate ion exchange membranes. Polymeric microporous substrates were obtained from lithium ion battery suppliers. Teklon HPIP substrates manufactured by Entek of Lebanon Oreg., Aporous substrates manufactured by Aporous Inc. of Billeric, Mass., Celgard substrates manufactured by Celgard, LLC of Charlotte, N.C., and Solupur 16P10A substrates manufactured by Lydall Filtration of Rochester, N.H. were pre-washed using isopropanol-ethanol and deionized water each for five minutes, respectively. The substrates were then rinsed by 0.5N NaCl (aq.) four times. Discs of substrate were die cut and the area resistivity and apparent permselectivty of each substrate was measured in accordance with Solartron 1280 operating procedures above. The data recorded are presented in Table 4.

TABLE 4

Resistivity and Permselectivity of Substrates

| Substrate | R (ohm cm$^2$) | Apparent Permselectivity % |
|---|---|---|
| Teklon HPIP | 0.593 | 57.24 |
| Solupor 16P10A | 2.192 | 57.38 |
| Celgard EZ-2590 PP | 0.788 | 57.54 |
| Celgard EZ-2090 PP | 1.159 | 57.38 |

Standard Operating Procedures of Osmotic Water Loss Tests

A two compartment cell was assembled using one ion exchange membrane positioned between 2 screen spacers. The concentrate and dilute compartments had dimensions of 18.54 cm×3.18 cm×0.05 cm. A first container was arranged in fluid communication with the dilute compartment and a second container was arranged in fluid communication with the concentrate compartment. The container arranged in communication with the dilute compartment was placed on top of a digital balance such that any change in volume in the dilute compartment could be measured by changes in volume in the container.

The cell was first tested to make sure that there were no mechanical sealing issues with the assembly. A piece of fabricated membrane was inserted in the cell and both compartments were fed with a sodium chloride solution have 35,000 ppm. Because both compartments were fed with solution having the same salinity, no water loss should have been observed. If water loss was observed, the assembly was reinserted in the cell or replaced to ensure that no water loss was observed.

The dilute compartment was then fed with a lower salinity concentration while the solution in the concentrate compartment was kept at a salinity of 35,000ppm. The dilute compartment was fed with a sodium chloride solution have 30,000 ppm, 25,000 ppm, 20,000 ppm, 15,000 ppm, 10,000 ppm, 5000 ppm, 1000 ppm, and 500 ppm. The weight change experienced in the dilute container was measured for each solution. Readings were taken about every 20 minutes for about two hours and the weight change was plotted against time.

The rate of osmotic water loss, expressed in gm/(m$^2$hr), was calculated from the water transport rate and the total effective membrane area. The osmotic water loss coefficient, expressed in gm/(m$^2$hr Bar) was calculated from the osmotic water transport rate, total effective membrane area, and osmotic pressure difference between the dilute and concentrated streams. The water loss experienced by the membranes were observed by plotting the water loss coefficient against the difference in salinity.

Anion exchange membranes were fabricated in accordance with aspects and embodiments to test the improvement in electrochemical properties of anion exchange membranes fabricated from the two-step process disclosed herein. Tertiary amine monomers were quarternized to produce a quaternized monomer solution and the Quat monomer solution was then mixed with a cross-linking monomer to form a monomer mix. Solutions having different monomer mixes were cast on microporous polymeric substrates and allowed to fill the pores of the substrate. An ion exchange membrane comprising an anion transferring polymeric layer was then formed from the wet, pore-filled, substrate. The area-resistivity and apparent permselectivity of the anion exchange membrane were then measured and the values were compared to the measured area resistivity and apparent permselectivy of a commercially available anion exchange membrane (AMX) offered by the Astom Corporation of Japan. The AMX membrane had a thickness of about 140 μm.

EXAMPLE 1

A quaternized monomer was produced by charging a 100 ml beaker with 3.1222 gm of clear and light yellow color 1-vinylimdazole and 4.0745 gm of clear, colorless benzyl chloride. The solution was stirred for 15 hours at room temperature. After stirring, the mix was very viscose and had a clear orange color. The resulting quaternized monomer solution was then mixed with 0.7417 gm of vinylbenzyl chloride (VBC), 1.3869 gm of dipropyleneglycol (DPG), and 0.0387 gm of 2,2'-dimethyl-2,2'azodipropiononitrile (Vazo® 64 produced by DuPont™ to the mix to initiate free radical polymerization. The Vazo® 64 was stirred until dissolved. A clear solution was obtained immediately after stirring.

Two 20 μm Celgard discs and one 20 μm Teklon HPIP disc was soaked in the monomer mix for 3 hours. The discs were sandwiched between polyester (Mylar) discs and air bubbles were removed from the soaked substrates. The assembly was placed in an airtight container, filled with nitrogen gas, and placed in an 80° C. oven for 2 hours. The fabricated membranes were then removed from the assembly and conditioned in 0.5 N NaCl (aq). The area resistance and permselectivity values of the fabricated membranes are presented in Table 5.

TABLE 5

Data of AEM fabricated from VI/BC/VBC

| Description | R (ohm cm2) | Apparent Permselectivity % |
|---|---|---|
| Astom AMX | 2.53 | 94.6 |
| Celgard EK2045 #1 (20 μm) | 1.38 | 95.4 |
| Celgard EK2045 #2 (20 μm) | 1.14 | 95.1 |
| Teklon HPIP (20 μm) | 1.46 | 95.2 |

The resulting membranes had improved apparent permselectivity, were thinner, and had lower area resistance than the Astom AMX. The data demonstrated that allowing a tertiary amine monomer to be fully chloro-alkylated in a first step process before being subsequently mixed with a cross-linking monomer produced anion exchange membranes having improved electrochemical properties.

The impact of the quaternization reaction, monomer mixture composition, process conditions, and general process scale were altered to determine how variations of these variables impacted the electrochemical performance of resultant membranes. The consistency of electrochemical properties between membranes fabricated was also investigated.

EXAMPLE 2

The process was scaled up to determine the impact of scale on resulting membranes. A quaternized monomer was produced in a 100 ml beaker charged with 29.2023 gm of clear and light yellow color 1-vinylimdazole and 38.1421 gm of clear, colorless benzyl chloride. The solution was stirred at room temperature for 17 hours. After stirring, the mix was very viscose and had a clear orange color. The resulting quaternized monomer solution was then mixed with 6.98 gm of VBC, 6.98 gm of DPG, and 0.0387 gm of Vazo® 64, and stirred. A clear solution was obtained immediately after stirring.

Two 20 μm Teklon HPIP discs and three 20 μm Celgard EK2045 discs were soaked in the monomer mix for 3 hours, thickness of both Celgard and Teklon were 20μm. The discs were sandwiched between polyester (Mylar) discs and air bubbles were removed from the soaked substrates. The assembly was placed in an airtight container, filled with nitrogen gas, and placed in an 80° C. oven for 4 hours. The fabricated membranes were then removed from the assembly and conditioned in 0.5 N NaCl (aq). The area resistance and permselectivity values of the fabricated membranes are presented in Table 6.

TABLE 6

Data of AEM fabricated from VI/BC/VBC

| Description | R (ohm cm$^2$) | Apparent Permselectivity % |
|---|---|---|
| Astom AMX | 2.92 | 94.3 |
| Teklon HPIP #1 | 1.56 | 95.4 |
| Teklon HPIP #2 | 1.11 | 94.9 |
| Celgard EK-2045 #1 | 1.34 | 95.1 |
| Celgard EK-2045 #2 | 1.32 | 95.1 |
| Celgard EK-2045 #3 | 1.42 | 95.3 |

The resulting membranes had improved apparent permselectivity, were thinner, and had a lower area resistance than the Astom AMX. The data further demonstrated that allowing a tertiary amine monomer to by fully chloroalkylated in a first step process before being mixed with a cross-linking monomer produced anion exchange membranes having improved electrochemical properties. The increased scale of the process did not have a discernible impact on the electrochemical properties of the resulting membranes. In addition, the electrochemical properties of membranes fabricated from the same polymeric microporous support were consistent between like-membranes.

Water loss tests were then performed on the membranes fabricated with Celgard ED-2045 substrates. Under a differential osmotic pressure of 7.5 bars, its water loss was 50 ml/m$^2$/hr; while at differential osmotic pressure of 27.5 bars, its water loss was 100 ml/m$^2$/hr. Under a differential osmotic pressure of 15.4 bars, its water loss was 48 ml/m$^2$/hr; while at differential osmotic pressure of 23 bars, its water loss was 88 ml/m$^2$/hr.

The osmotic water loss of this membrane made with Celgard Teklon HPIP was measured. Under a differential osmotic pressure of 15.4 bars, its water loss was 11 ml/m$^2$/hr; while at differential osmotic pressure of 23 bars, its water loss was 30 ml/m$^2$/hr.

The osmotic water loss of the Astom AMX was measured. Under a differential osmotic pressure of 19.2 bars, the water loss was 44 ml/m$^2$/hr. The data indicated that the Celgard membranes had comparable water loss to the Astom AMX.

EXAMPLE 3

The affect of soaking time of the polymeric microporous substrates was then investigated. A quaternized monomer was produced by charging a 100 ml beaker with 29.2221 gm of clear and light yellow color 1-vinylimdazole and 38.1466 gm of clear, colorless benzyl chloride. The solution was stirred at room temperature for 17 hours. After stirring, the mix was very viscose and had a clear orange color. The resulting quaternized monomer solution was then mixed with 7.05 gm of VBC, 13.10 gm of DPG, and 0.88 gm of Vazo® 64, and stirred. A clear solution was obtained immediately after stirring.

One 20 μm Teklon HPIP disc and one 20 μm Celgard EK2045 disc were wet instantaneously and allowed to stay in the monomer mix for 25 minutes. The discs were sandwiched between polyester (Mylar) discs and air bubbles were removed from the soaked substrates. The assembly was placed in an airtight container, filled with nitrogen gas, and placed in an 80° C. oven for 2 hours. The fabricated membranes were then removed from the assembly and conditioned in 0.5 N NaCl (aq). The area resistance and permselectivity values of the fabricated membranes are presented in Table 7.

TABLE 7

Data of AEM fabricated from VI/BC/VBC

| Description | R (ohm cm$^2$) | Apparent Permselectivity % |
|---|---|---|
| Astom AMX | 2.92 | 94.1 |
| Teklon HPIP | 1.55 | 95.1 |
| Celgard EK-2045 | 1.39 | 95.7 |

The data indicated that soaking time could be shortened without detrimentally affecting the electrochemical properties of the resulting membranes.

EXAMPLE 4

The affect of the addition of solvents to the monomer mixture was investigated. A mix was made as described in example 3, and an additional 4.01 gm of DPG was added to 79.92 gm of the mix. One 20 μm Teklon HPIP disc and one 20 μm Celgard EK2045 discs were wet instantaneously and allowed to stay in the monomer mix for 25 minutes. The discs were sandwiched between polyester (Mylar) discs and air bubbles were removed from the soaked substrates. The assembly was placed in an airtight container, filled with nitrogen gas, and placed in an 80° C. oven for 2 hours. The fabricated membranes were then removed from the assembly and conditioned in 0.5 N NaCl (aq). The area resistance and permselectivity values of the fabricated membranes are presented in Table 8.

TABLE 8

Data of AEM fabricated from VI/BC/VBC/DPG

| Description | R (ohm cm$^2$) | Apparent Permselectivity % |
|---|---|---|
| Astom AMX | 2.87 | 94.1 |
| Teklon HPIP | 1.48 | 96.2 |
| Celgard EK-2045 | 1.31 | 95.6 |

The resulting membranes had improved apparent permselectivity, were thinner, and had a lower area resistance than the Astom CMX. The addition of DPG solvent to the monomer mix, however, appeared to decrease resistivity and increase apparent permselectivity. The data indicated that the addition of solvents to the monomer mixture may improve membrane properties.

EXAMPLE 5

The effect of solvents added to monomer mix and substrate soaking time were jointly investigated. A mix was made as described in example 4, and additional 4.18 gm of DPG was added to 76.06 gm of the mix. One 20 μm Teklon HPIP disc and one 20 μm Celgard EK2045 discs were wet instantaneously and allowed to stay in the monomer mix for 1.5 hours. The discs were sandwiched between polyester (Mylar) discs and air bubbles were removed from the soaked substrates. The assembly was placed in an airtight container, filled with nitrogen gas, and placed in an 80° C. oven for 65 minutes. The fabricated membranes were then removed from the assembly and conditioned in 0.5 N NaCl (aq). The area resistance and permselectivity values of the fabricated membranes are presented in Table 9.

TABLE 9

Data of AEM fabricated from VI/BC/VBC/DPG - Extended Soak Time

| Description | R (ohm cm$^2$) | Apparent Permselectivity % |
|---|---|---|
| Astom AMX | 2.81 | 94.9 |
| Teklon HPIP | 1.41 | 95.1 |
| Celgard EK-2045 | 1.13 | 95.1 |

The resulting membranes had improved apparent permselectivity, were thinner, and had a lower area resistance than the Astom CMX. The resulting membranes generally had lower area resistivity than the membranes that were produced from substrates that were not allowed to soak for as long a period in the monomer mix. The apparent permselectivity did not appear to be affected by soak time. The data indicated that better area resistivity is achieved when the substrate is allowed to soak for longer periods of time in the monomer mix.

EXAMPLE 6

Different cross-linking agents were then investigated to determine their effect on the properties of the resulting membranes. Each membrane was made from a 20 μm Teklon HPIP substrate and the substrate was coated with quaternized 1-vinylamidazole produced from the same batch of quaternized 1-vynilidazole solution.

A quaternized 1-vinylimidazole (QVI) solution was prepared by mixing 15.6823 gm of 1-vinylimidazole, 21.1925 gm of benzyl chloride, and 6.2581 gm of N-methypyrolidone (NMP) in a 250 ml beaker. The solution was stirred at room temperature for 5 hours, and then mixed for an addition hour at a gradually increasing temperature. The temperature after the 6$^{th}$ hour was 58° C. The mixture was then removed from heat and stirred at room temperature for an additional 18 hours. The mixture turned a clear golden color. 10 gm of NMP were added.

EXAMPLE 6A

AEM Fabrication from VI/BC/NMP/VBC on 20 μm Teklon HPIP Substrate

The QVI solution was first mixed with vinylbenzyl chloride. 13.0580 gm of QVI were mixed with 2.5427 gm of vinylbenzyl chloride (VBC) and stirred to homogenize the mixture. Teklon HPIP discs having a thickness of 20 μm were wet instantaneously and allowed to soak in the monomer mix for 1 hour. The discs were sandwiched between polyester (Mylar) discs and air bubbles were removed from the soaked substrates. The assembly was placed in an airtight container, filled with nitrogen gas, and placed in an 80° C. oven for 70 minutes. The fabricated membranes were then removed from the assembly and conditioned in 0.5 N NaCl (aq).

EXAMPLE 6B

AEM Fabrication from VI/BC/NMP/DVB/HEOMA on 20 μm Teklon HPIP Substrate

The QVI solution was then mixed with divinylbenzene (DVB) and hydroxyehtylmethylacrylate (HOEMA). 15.2864 gm of QVI were mixed with 3.7745 gm of DVB (80% mixture of p-DVB and m-DVB, 20% ethyl benzene) and 2.8966 gm of HEOMA and stirred to homogenize the mixture. Teklon HPIP discs having a thickness of 20 μm were wet instantaneously and allowed to soak in the monomer mix for 1 hour.

The discs were sandwiched between polyester (Mylar) discs and air bubbles were removed from the soaked substrates. The assembly was placed in an airtight container, filled with nitrogen gas, and placed in an 80° C. oven for 80 minutes. The fabricated membranes were then removed from the assembly and conditioned in 0.5 N NaCl (aq).

EXAMPLE 6C

AEM Fabrication from VI/BC/NMP/EGDM/HEOMA on 20 μm Teklon HPIP Substrate

The QVI solution was then mixed with ethyleneglycol dimethacrylate (EGDM) and HOEMA. 15.2864 gm of QVI were mixed with 2.5707 gm EGDM, 1.4550 gm HOEMA, and 1.0784 gm 1-proponol. Teklon HPIP discs having a thickness of 20 μm were wet instantaneously and allowed to soak in the monomer mix for 1 hour. The discs were sandwiched between polyester (Mylar) discs and air bubbles were removed from the soaked substrates. The assembly was placed in an airtight container, filled with nitrogen gas, and placed in an 80° C. oven for 50 minutes. The fabricated membranes were then removed from the assembly and conditioned in 0.5 N NaCl (aq). The data from Examples 6A-6C are presented in Table 10.

TABLE 10

AEM fabrication from VI/BC/NMP and Different Cross-Linking Agents

| Cross-linking agent(s) | R (ohm cm$^2$) | Apparent Permselectivity % |
|---|---|---|
| Example 6A: (VBC) | 2.62 | 95.2 |
| Example 6B: (DVB, HEOMA) | 28.97 | 95.0 |
| Example 6C: (EGDM, HEOMA) | 3.57 | 95.0 |

All cross-linking agents tested produced comparable apparent permselectivity values and all were higher than the apparent permselectivity of the Astom AMX. When DVB was used as a cross-linking agent, the area-resistivity was very high, which correlated directly to the high $r_2/r_s$ value of the p-DVB used. When EGDM and HOEMA were used as cross-linking agents, the area resistivity was lower, but still not as low as when VBC was used, which had the lowest $r_2/r_s$ value of the cross-linking monomer combinations used.

The data indicated that for fabricated anion exchange membranes, electrochemical properties are enhanced when a cross-linking agent with a low $r_2/r_s$ value is used.

EXAMPLE 7

The quaternization reaction time was then increased to determine its effect on resulting membranes. A 50 ml beaker was charged with 5.2454 gm of clear and light yellow color 1-vinylimdazole, 9.2210 gm of clear, colorless benzyl chloride, and 2.6613 gm NMP. The solution was stirred at room temperature for 42.5 hours. After stirring, the mix was viscose and had a clear orange color. The solution was then mixed with 1.0368 gm of vinylbenzyl chloride (VBC), 0.2553 gm of 1-butanol, 1.6354 gm of HOEMA, 2.0071 gm of 1-vinylimidazole, and 0.3340 gm of Vazo®64. A clear, yellowish, solution was obtained immediately after stirring.

Three 20 μm Celgard EK2045 discs and three 20 μm Teklon HPIP discs were each soaked in the monomer mix for 30 minutes. The discs were sandwiched between polyester (Mylar) discs and air bubbles were removed from the soaked substrates. The assemblies were placed in an airtight container, filled with nitrogen gas, and placed in an 80° C. oven for one hour. The fabricated membranes were removed from the assemblies and immersed in absolute ethanol for 20 minutes in a 100 ml glass beaker to leach out 1-butanol. They were then rinsed in 0.5N NaCl (aq) twice then and conditioned in fresh 0.5 N NaCl (aq) solution for 1.5 hours. The area resistance and permselectivity of the fabricated membranes are presented in Table 11.

TABLE 11

Data of AEM fabricated from VI/BC/VBC/HOEMA/NMP

| Description | R (ohm cm$^2$) | Apparent Permselectivity % |
|---|---|---|
| Teklon HPIP #1 | 1.50 | 95.6 |
| Teklon HPIP #2 | 1.46 | 95.2 |
| Teklon HPIP #3 | 1.75 | 95.4 |
| Celgard EK-2045 #1 | 1.39 | 95.2 |
| Celgard EK-2045 #2 | 1.65 | 95.5 |
| Celgard EK-2045 #3 | 1.64 | 95.5 |

Casting a monomer mix on a microprous substrate to prepare ion exchange membranes in accordance with the one-step methods disclosed herein provides for the fabrication of improved ion exchange membranes. The method enables the fabrication of membranes using at least one functional monomer and at least one cross-linking agent on thermal weldable, microporous, polyolefin substrates. The membranes described herein may be made in large quantities and may be made continuously. The membranes may be fabricated in a machine having a saturation tank that allows the pores of a substrate to be completely filled by a monomer mix. The wet substrates may then pass through a heated or UV curing zone to polymerize and solidify the mix on the substrate into a finished membrane. The membranes can be dried, re-wet, and reused, and may be thinner, and fabricated at costs lower than commercially available membranes. Further, membranes in accordance with aspects and embodiments may have improved electrochemical properties, such as lower area resistance and higher permselectivity. The membranes of the present invention may reduce the energy consumption of an electrochemical separation process, increase water recovery, increase the effective membrane area capable of being packed in the same volume of membrane module, and may enhance the overall efficiency of electrochemical separation processes.

The phraseology and terminology used herein is for the purpose of description and should not be regarded as limiting. Any references to embodiments or elements or acts of the apparatus and methods herein referred to in the singular may also embrace embodiments including a plurality of these elements, and any references in plural to any embodiment or element or act herein may also embrace embodiments including only a single element. The use herein of "including," "comprising," "having, " "containing," "involving," and variations thereof is meant to encompass the items listed thereafter and equivalents thereof as well as additional items. Any references to positional or spatial orientation are intended for convenience of description, not to limit the present apparatus and methods or their components.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

The invention claimed is:

1. A method of making an anion exchange membrane, comprising:
    mixing a tertiary amine monomer with a quaternization agent to produce a quaternary amine monomer;
    mixing a cross-linking agent and a solvent with the functional monomer to form a monomeric solution; and
    casting the monomeric solution on a polymeric microporous substrate to form the anion exchange membrane.

2. The method of claim 1, wherein the tertiary amine monomer is selected from the group consisting of 1-vinylimidazole, 2-methyl-1-vinylimidazole, 9-vinylcarbazole, N-ethyl-2-vinylcarbazole, 2-vinylpyridine, 3-vinylpyridine, 4-vinylpyridine, and mixtures thereof.

3. The method of claim 2, wherein the quaternization agent is selected from the group consisting of benzyl chloride, benzyl bromide, benzyl iodide, p-dichlorobenzene, m-dichlorobenzene, 1,4-dichloro-2-nitrobenzene, 3-(benzyloxy)benzyl chloride, 4-(benzyloxy)benzyl chloride, 2-(trifluoromethyl)-benzyl chloride, 3-(trifluoromethyl)benzyl chloride, 4-(trifluoromethyl)benzyl chloride, 1-chlorohexane, 1-chloropentane, 1-chlorobutane, 1-chloropropane, 1,6dichlorohexane, 1,5-dichloropentane, 1,4-dichlorobutane, 1,3-dichloropropane, 1-bromohexane, 1-bromopentane, 1-bromobutane, 1-bromopropane, 1,6-dibromohexane, 1,5-dibromopentane, 1,4-dibromobutane, 1,3-dibromopropane, 1-iodohexane, 1-iodopentane, 1-iodobutane, 1-iodoopropane, 1-iodideethane, 1-iodidemethane,1,6-diiodohexane, 1,5-diiodorpentane, 1,4-diiodobutane,1,3-diiodopropane, and mixtures thereof.

4. The method of claim 3, wherein the cross-linking agent is selected from the group consisting of vinylbenzyl chloride, m-divinylbenzene, ethyleneglycol-dimethacrylate, p-dichlorobenzene, m-dichlorobenzene, 1,4-dichloro-2-nitrobenzene, 1,6dichlorohexane, 1,5-dichloropentane, 1,4-dichlorobutane, 1,3-dichloropropane, 1,6-dibromohexane, 1,5-dibromopentane, 1,4-dibromobutane, 1,3-dibromopropane, 1,6-dibromohexane, 1,5-dibromopentane, 1,4-dibromobutane, 1,3-dibromopropane, 1,4-butanediol dimethacrylate, 1,4-butanediol diacrylate, 1,6-hexanediol diacrylate, pentaerythritol triacrylate, divinyl benzene, (m- and p-mixture), trimethylolpropane triacrylate, trimethylolpropane trimethacrylate, ethoxylated (n) bisphenol A di(meth)acrylate (n=1.5, 2, 4, 6, 10, 30), ethoxylated (n) trimethylolpropanetri(meth)acrylate (n=3, 6, 9, 10, 15, 20), propoxylated (n) trimethylolpropane triacrylate (n=3, 6), and mixtures thereof.

5. The method of claim 4, wherein the solvent is selected from the group consisting of dipropyleneglycol, n-propanol, 2-propanol, 1-methyl-2-pyrrolidinone, 1-butanol, and mixtures thereof.

6. The method of claim 5, further comprising mixing a polymerization initiator with the monomer solution.

7. The method of claim 6, wherein the polymerization initiator is selected from the group consisting of organic peroxides, 2,2'-azobis [2, [2-imdazolin-2-yl]-propane] dihydrochloride, α, α'-azoisobutyronitrile, 2,2'-azobis[2-methylpropioaminidine] dihydrochloride, 2,2'-azobis[2, [2-imdazolin-2-yl]-propane], dimethyl 2,2'-azobis[2-methylpropionate] and benzoyl peroxide.

8. The method of claim 7, further comprising controlling polymerization with an inhibitor.

9. The method of claim 8, wherein the polymerization inhibitor is selected from the group consisting of 4-methoxyphenol and 4-tert-butyl catechol.

10. The method of claim 9, wherein the polymeric microporous substrate comprises at least one polymeric material selected from the group consisting of polypropylene, high molecular weight polyethylene, ultrahigh molecular weight polyethylene, polyvinyl chloride, polyvinylidene difluoride, and polytetrafluoroethylene.

11. The method of claim 10, wherein casting comprises applying heat at a temperature of about 0° C. to about 100° C., ultraviolet light at a wavelength of about 100 nm to about 400 nm, or ionizing radiation.

* * * * *